July 31, 1962 E. LAIMINS 3,046,782
STRAIN GAGE TRANSDUCER CIRCUIT
Filed April 28, 1959 2 Sheets-Sheet 1

INVENTOR
ERIC LAIMINS
BY
ATTORNEY

July 31, 1962  E. LAIMINS  3,046,782
STRAIN GAGE TRANSDUCER CIRCUIT
Filed April 28, 1959  2 Sheets-Sheet 2

INVENTOR
ERIC LAIMINS
BY
ATTORNEY

United States Patent Office 3,046,782
Patented July 31, 1962

3,046,782
STRAIN GAGE TRANSDUCER CIRCUIT
Eric Laimins, Cambridge, Mass., assignor to Baldwin-Lima-Hamilton Corporation, a corporation of Pennsylvania
Filed Apr. 28, 1959, Ser. No. 809,395
3 Claims. (Cl. 73—141)

The present invention relates to the resistance strain gage transducer field in which broadly an electrical strain gage, of the resistance type, whether bonded or unbonded, is employed to sense the elastic response of a transducer element resulting from a condition to be measured. While the following disclosure will deal specifically with load transducers for the sake of simplicity, it will be seen that my invention applies equally well to transducers of other types such as those used for measuring fluid pressure, acceleration, torque, etc.

It has been common in use of such transducers to employ an electrical method of calibration known as "shunt" calibration in which a relatively high resistance shunt is applied across two adjacent terminals of the transducer bridge network to simulate the response of the transducer to a pre-determined stimulus resulting from the condition to be measured. In the prior art, resistance strain gages made of a material such as Constantan have been employed in conjunction with the shunt calibration method with good results. Constantan has the property, when used as a resistance strain gage, that its strain sensitivity (gage factor) and its electrical resistance are both substantially independent of temperature.

Certain strain-sensitive alloys which are commercially available exhibit strain sensitivities appreciably greater than that of Constantan (for example, a Tungsten-Platinum alloy commercially available has a gage factor approximately double that of Constantan) and therefore are of great interest as a possible means to increase the over-all sensitivity of transducers, something very much to be desired. On the other hand, such highly sensitive alloys as are known and commercially available invariably exhibit substantial positive temperature coefficients of resistance and substantial negative temperature coefficients of gage factor. If transducers are gaged with strain gages made of such materials, experience shows—and it may easily be demonstrated mathematically—that the application of the well-known shunt calibration method leads to serious errors when the operating temperature of the transducer is significantly varied, assuming conventional gaging and circuitry are used. Since the prior art has not had a practical straight-forward solution to this problem the advantageous sensitivities of certain strain-sensitive alloys have not been made use of.

It is an object of my present invention to provide means for taking advantage of the higher sensitivity of certain strain-sensitive alloys in transducer design while at the same time making the response of the transducer both to a conventional shunt calibration and to a pre-determined stimulus of the condition to be measured substantially independent of the operating temperature of the transducer.

Figure 3:
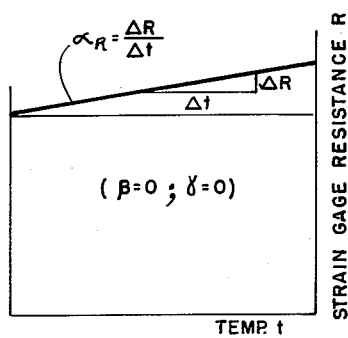
Figure 4:
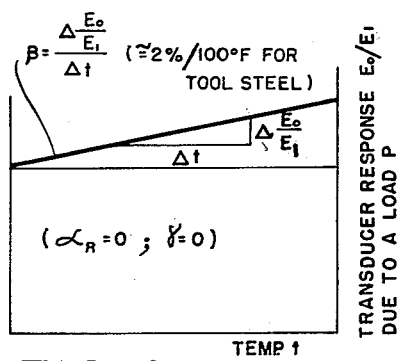
Figure 5:
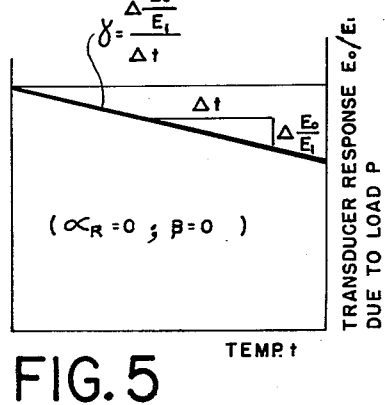
Figure 7A:
Figure 6:
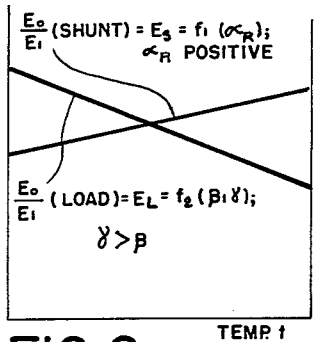
Figure 7:
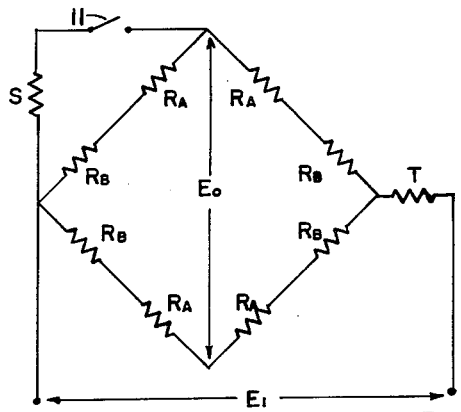
Figure 8:
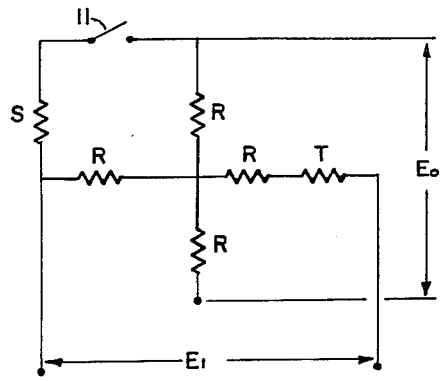
Figure 10:
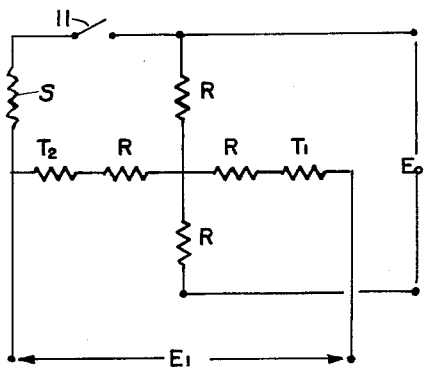
Figure 9:
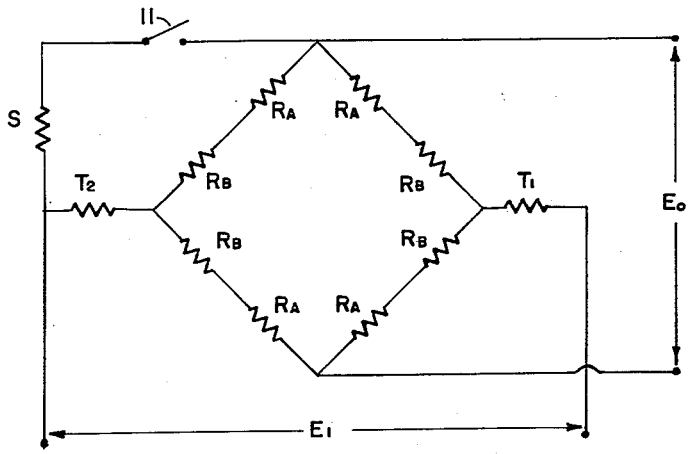

FIGS. 3 through 6 are diagrams used in explaining the problems connected with application of shunt calibration to transducers in the general cases; FIG. 3 showing typical strain gage circuits versus temperature for a positive coefficient material; FIG. 4 showing characteristics of transducer response versus temperature due to the modulus coefficient of the transducer material acting alone; FIG. 5 showing the transducer response versus temperature due to a negative temperature coefficient strain gage factor acting alone; and FIG. 6 showing how the transducer response due to load shunt can be manipulated in accordance with the present disclosure;

FIG. 7 is a schematic circuit diagram embodying the principles of my present invention in a preferred form;

FIG. 7A illustrates a force-responsive transducer corresponding to FIG. 7;

FIG. 8 is an equivalent circuit to FIG. 7 for purposes of simplifying calculations;

FIG. 9 is a modification of the embodiment shown in FIG. 7 in which the temperature responsive means comprises two separate elements; and FIG. 10 is an equivalent circuit diagram to FIG. 9 for purposes of simplifying calculations.

*Meaning and Use of Shunt Calibration*

Figure 1:
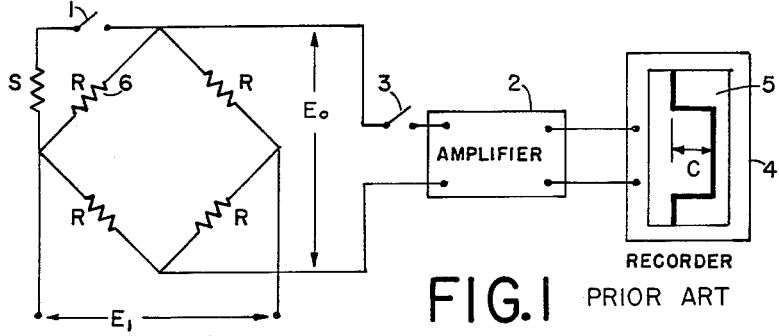
FIG. 1 represent a conventional shunt calibration system for purposes of explanation of prior art.

For purposes of explanation, assume that FIG. 1 represents a resistance strain gage bridge, each arm of which has a resistance R, and assume the outer terminals of the bridge are supplied from a voltage source $E_1$. Assume also that the bridge is provided with a shunt, S, which may be connected across one arm at will by operation of key 1, so that closing key 1 produces a change of open-circuit output signal $E_0$. In normal operation, the output of such a resistance bridge circuit is connected to an amplifier 2 by closing key 3, and from thence to a recorder 4, shown schematically as a strip-chart recorder with the chart seen through window 5.

Now, one of the very common problems encountered in operating equipment such as that shown schematically in FIG. 1 is that the overall sensitivity of the system to a given imposed condition such as a change in resistance of strain gage 6 due to imposition of a pre-determined magnitude of strain will, for various reasons, change somewhat from time to time, making it imperative that the user of the equipment have at his disposal some simple and convenient method of calibrating his entire electrical system at any time. The cause of such change is made up of such factors as variation in bridge power voltage $E_1$; variation in gain of amplifier 2, resulting from changing line voltage, temperature, etc.; variation in sensitivity of recorder for similar reasons.

Now it may be seen that by shunting gage 6 by shunt S, using key 1, one can conveniently produce at any time an output signal $E_0$, which will correspond to the output voltage which would result from a predetermined change in resistance of one of the bridge arms, such as 6. Since the resulting output signal $E_0$ automatically reflects the magnitude of $E_1$ at the instant of calibration, it may be seen that by pressing key 1 and observing on the record the corresponding deflection $C_s$, the operator has completely determined the relationship of a given deflection $C_s$ on his record and the above-mentioned predetermined resistance change, due to strain. In other words, he has "calibrated" his electrical system so that from this point on he can readily interpret his record directly in terms of strain, without having to know or determine the value of $E_1$, the gain in the amplifier, the sensitivity of the recorder, or any other variables that might influence the calibration, such as change of dimension of the recording paper as the result of humidity.

Because of its convenience and simplicity, this shunt calibration technique is very widely used in the field of electrical strain gages. The reliability of this extremely simple arrangement of FIG. 1 is, however, dependent upon two conditions which are easily met by certain commercially available resistance strain gages. These are:

(1) Strain gages or resistances making up the arms of the bridge must have such low temperature coefficients of resistance that resistances R can be assumed constant, regardless of temperature; and (2) The strain sensitivity or "gage factor" of a strain gage such as 6 (i.e., its change of resistance resulting from a pre-determined applied strain) must be substantially independent of temperature change.

Fortunately, for most strain measuring work, where inaccuracies of ½ to 1% are acceptable, there are commercially available strain gages which satisfy these requirements adequately. Such strain gages are normally made of Constantan alloy as the strain sensitive filament.

Application of Shunt Calibration to Transducers— Simplest Case

Taking as an example for purposes of explanation a very simple resistance strain gage transducer such as the force-measuring dynamometer, of Ruge Patent No. 2,561,318, where electrical resistance strain gages such as 16, 17, 18, 19 are connected into a bridge circuit in order to measure force acting on the dynamometer, one soon finds that the shunt method of calibration runs into a number of complications when results of high accuracy are required in the face of changing temperature. In the simplest case, we may assume that the above-mentioned strain gage requirements have been adequately met; i.e., the resistance and strain sensitivity of the gages themselves may be assumed independent of temperatures. A serious complication (for precise measurement) still arises out of the fact that the material from which dynamometer element 3 is made will, in general, vary in its elastic response to force as a result of variation in temperature. That is to say, for most metals suitable for such application the elastic property known as Young's Modulus will vary with temperature; for most metals in common use, the Young's Modulus will decrease with increasing temperature by approximately 2% per 100° F. change, which is typical for instance of tool steels. The result of this complication is that under the conditions assumed in this paragraph the response of the strain gage circuit associated with the sensing element will increase as the temperature increases, and the effect is sufficiently large that it cannot be ignored where accurate results are to be obtained over a substantial range of operating temperature such as is frequently met in field testing of rockets and many other force-measuring problems.

Figure 2:
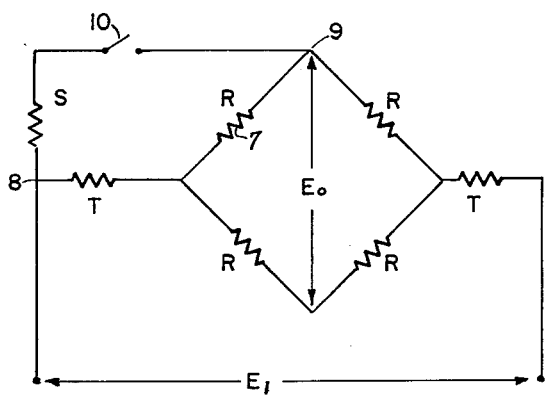
FIG. 2 represents the application of shunt calibration to simple transducers of prior art.

For this simple case, there is a well-known and adequate solution to the shunt calibration problem. This is illustrated schematically in FIG. 2 where again we have a bridge circuit, at least one arm of which, 7, is a resistance strain gage responsive to elastic deflection of the transducer due to the condition to be measured, such as a load or force. Temperature-sensitive resistance elements T, are approximately symmetrically interposed between the power terminals of the bridge and the power input voltage $E_1$. These temperature-sensing elements are preferably made up of a material such as nickel which is highly responsive in its resistance change to temperature and they are physically disposed so that they sense the temperature of the elastic transducer element. If resistors T are chosen properly, it may be seen that one can offset the effect of the Young's Modulus change since, with rising temperature, the resistors T will reduce the voltage actually appearing across the power terminals of the bridge, thus counteracting the effect of the Young's Modulus change. It may be shown, and is indeed well known, that the application of a shunt S across terminals 8, 9 of the circuit of FIG. 2, by closing key 10, will under the assumed conditions produce a calibration of the electrical system, which is in all respects as free of temperature error as was the case of the circuit of FIG. 1. For literature regarding above refer to "Strain Gage Readings— vol. 1, No. 4, pages 7–14 including "Calibration of Strain Gage Transducers With Modulus Compensating Resistors," by Peter Stein.

Application to Transducers—General Case

My present invention is concerned with the application of "shunt" calibration to the general case in which some or all of the simplifying assumptions made in the foregoing discussions are not valid, either because of the employment of unconventional materials in the strain gages or because the accuracy requirements are such that the usual simplifying assumptions associated with conventional materials are not permissible. In this general case, one encounters three complications which have not heretofore been dealt with in the strain gage and transducer art and which my present invention provides the means for dealing with so that all the simplicity and convenience of the shunt calibration method may be retained without loss of accuracy even though the transducer is operated over a wide range of temperature. In the preferred embodiment of my invention, I deliberately employ a pre-determined amount of strain-sensitive material, the resistance of which changes appreciably with temperature and the strain sensitivity of which also changes appreciably with temperature. In this preferred arrangement of my invention, I am able to very significantly increase the sensitivity of a given transducer design and still retain all the advantages of precise shunt-calibration despite variation in operating temperature. My invention will be more readily understood by those skilled in the art with the help of a detailed explanation of the factors involved. The explanation is quite complex because three variables are present simultaneously as functions of temperature, leading to rather lengthy mathematical expressions. However, notwithstanding such complications I have been able to express the principles of my invention with sufficient relative simplicity as shown in FIG. 7 so that the principles may be used effectively and expeditiously in production manufacture, as is demonstrated by the experience of building large numbers of transducers with extremely good results. Furthermore, so far as the ultimate user of the transducer is concerned, reference to FIG. 7 will show that the user is able still to employ successfully his desired shunt calibration method precisely the same as that discussed in connection with the extremely simple case exemplified by FIG. 1.

The three simultaneous variables referred to in the paragraph above are:

(1) The resistance of a given strain gage element may vary appreciably with temperature;
(2) The strain sensitivity (gage factor) of a given strain gage element may vary appreciably with temperature; and
(3) The elastic modulus of the transducer material may vary appreciably with temperature.

In a general case treated herein below, these three variables exist simultaneously. Their effects are first considered individually, then in combination, then a preferred embodiment of the present invention is described and analyzed mathematically to demonstrate the validity of the principle involved and to illustrate how they may be applied. Finally, numerical results of an actual practical example are given to show the degree of accuracy of shunt calibration that can be obtained by application of the principles of my invention in actual production shop operation.

As a matter of convenience, the response of a transducer network to a given stimulus is normally expressed in terms of the ratio of the open-circuit output voltage to the input voltage. For example, in the load transducer of FIG. 2 the response to a load P is expressed as $E_0/E_1$, the result being often expressed in terms of volts per volt or sometimes millivolts per volt, meaning volts or millivolts output per volt input for a given load P. Similarly, for the application of a shunt S, the response is again expressed as $E_0/E_1$. It may readily be seen that for practical laboratory and field measurement applications, it is essential that $E_0/E_1$ for a given force P must be substantially independent of temperature; otherwise, all other things being equal, the scale of the record would always be varying with the temperature of the transducer which would be most annoying to the record analyst as he compares one record with another and as he compiles data from a large number of records taken under different temperature conditions. This being so, it is also essential that $E_0/E_1$ produced by a given shunt S, must be substantially independent of temperature. Since any compromise with either or both of these conditions leads either to serious errors or to completely unacceptable complications for the record analyst, the simple fact of the matter is that these two conditions must be met, with the result that if temperature alone varies the scale of the record will be always the same and the shunt calibration method retains the simplicity of the system described in connection with FIG. 1.

*Effect of Temperature on Strain Gage Resistance Due to Temperature Coefficient of Resistance Alone*

FIG. 3 illustrates a typical relationship between the resistance of a strain gage element, R, and the temperature, t, all other factors assumed constant. Shown here is the important case to be dealt with in this disclosure, namely, the strain gage resistance increasing with increasing temperature. The temperature coefficient of resistance of the strain gage is defined as $\alpha_R$ which is defined to be the ratio of a change in resistance $\Delta_R$ to a corresponding small change in temperature $\Delta t$. For the materials we are concerned with here the coefficient $\alpha_R$ may be considered a constant; that is, a substantially linear relationship exists between gage resistance and temperature.

*Effect of Temperature on Transducer Response Due to Temperature Coefficient of Young's Modulus Alone*

FIG. 4 shows how the temperature coefficient of Young's modulus of a transducer material such as tool steel, causes the transducer response to increase with increasing temperature, all other factors assumed constant. For the purposes of the following analysis this response coefficient is designated as $\beta$ and in the case of a load transducer is defined as the ratio of the change in load response to a small corresponding temperature change. For all practical purposes in transducer design, $\beta$ is a constant and for many materials such as tool steel it can be taken as approximately $+/2\%$ per 100° F. temperature change.

*Effect of Temperature on Transducer Response Due to Temperature Coefficient of the Gage Factor Alone*

FIG. 5 shows how the transducer response varies with temperature in the case of a strain gage having a negative temperature coefficient of its gage factor, all other factors assumed constant (i.e., $\alpha_R=0; \beta=0$). This is characteristic of particular types of strain sensitive material employed in a preferred embodiment of my present invention. The coefficient $\gamma$ for a load transducer (where $\alpha_R=0; \beta=0$) is defined to be the ratio of the change in the load response due to change in gage factor alone to a small corresponding change of temperature, and for all practical purposes $\gamma$ may be regarded as constant over the normal temperature range of transducers.

*Effect of Temperature on Transducer Response Due to α, β, and λ Acting Simultaneously*

Now we consider what happens when we combine the conditions of FIGS. 3, 4, and 5 in an actual transducer of the general case. We can suppose, for example, that FIG. 1 represents a bridge circuit made up of strain gages having the characteristics shown in FIGS. 3 and 5 and assume that the transducer elastic material has the characteristics shown in FIG. 4. In such a case, we can readily see that the transducer response to shunt and load as function of temperature may be represented by the two curves of FIG. 6. The transducer response due to shunt is seen to be a rising characteristic with increasing temperature and it is, of course, a simple linear function of $\alpha_R$, since as R increases with temperature the effect of the shunt in unbalancing the bridge becomes correspondingly greater. The transducer response due to load is shown as a drooping characteristic under the condition $\gamma$ greater than $\beta$ which is a necessary condition for the preferred embodiment of my invention shown in FIG. 7. Now the requirements as set forth in the beginning of this general case discussion are that both of these response curves must be horizontal lines; in other words, the responses due to shunt and load must be constant in the face of temperature variation.

FIG. 7 illustrates schematically a preferred embodiment of my present invention in which I provide the means to correct the condition illustrated in FIG. 6 in a relatively simple and effective manner. Briefly, in one or more arms of the transducer bridge circuit, I employ two series-connected strain gages, $R_A$, $R_B$, one of the grids $R_A$ having characteristics as shown in FIGS. 3 and 5; namely, a positive $\alpha_A$ and a negative $\gamma_A$; furthermore, having the characteristic that $\gamma$ is greater than $\beta$ of FIG. 4. The other strain gage grid $R_B$ is preferably made of a strain-sensitive material such that its $\alpha_B$ and $\gamma_B$ coefficients can be considered to be zero, although this is not a necessary condition for the application of my invention in this preferred embodiment. Grids $R_A$ and $R_B$ are preferably subject to the same transducer strain, or at least both are subject to strains having the same algebraic sign in the preferred embodiment.

I have discovered that I can find a ratio $R_A$ to $R_B$ and a value of temperature-sensing element T, such that the transducer responses due to both shunt and load will be substantially independent of temperature variations. For purposes of circuit analysis, it is very convenient to convert the circuit in FIG. 7 into the equivalent circuit of FIG. 8 in which $$\frac{R_A+R_B}{2}=R$$

As in all previous discussion, the quantity $E_0$ is the open-circuit output voltage resulting from application from shunt S by closing key 11 or from application of a load to the transducer. An analysis of this simplified equivalent circuit of FIG. 8 for response to shunt S leads to the following result:

$$\frac{E_0}{E_1}=\frac{R^2}{3R^2+2RS+2RT+ST} \qquad \text{Equation 1}$$

In this equation, two quantities, R and T, both are functions of temperature. The equation, of course, represents the response of the network to the application of the shunt S and in order to make this response independent of temperature, it is necessary to satisfy the condition that a derivation $E_0/E_1$ with respect to temperature shall vanish. That is:

$$\frac{d\frac{E_0}{E_1}}{dt}=\frac{\partial \frac{E_0}{E_1}}{\partial T}\cdot\frac{dT}{dt}+\frac{\partial \frac{E_0}{E_1}}{\partial R}\cdot\frac{dR}{dt}=0 \qquad \text{Equation 2}$$

If this operation is carried and we substitute the following:

$$\frac{dT}{dt}=\alpha_T\cdot T_0 \qquad \text{Equation 3}$$

$$\frac{dR}{dt}=\alpha_R\cdot R_0 \qquad \text{Equation 4}$$

where $\alpha_T$ and $\alpha_R$ are the temperature coefficients of resistance of T and R, respectively, and where $T_0$ and $R_0$ are the initial resistances of T and R at some base temperature from which a change is to be made, a straight-forward mathematical operation results in the following equation:

$$T_0 = \frac{2R_0}{\frac{\alpha_T}{\alpha_R} - 2} \quad \text{Equation 5}$$

For reasons of simplicity, assume strain gage grid $R_B$ made of a strain sensitive material such that its $\alpha$ and $\gamma$ coefficients can be considered zero. Since Eq. 1 represents the response of the network to the application of shunt S, only strain gage grid $R_A$ and resistor T are both functions of temperature and whose derivatives with respect to temperature will be other than zero. Consequently, considering temperature effect on response of the network to application of shunt S, only grid $R_A$ has to be considered and in equivalent circuit of FIG. 8 now functionally:

$$R = \frac{R_A}{2}$$

Equations 1 and 5 can be rewritten now as follows:

$$\frac{E_0}{E_1} = \frac{R_A^2}{3R_A^2 + 2R_A S + 2R_A T + ST}$$

Equation 1a $$T_0 = \frac{2R_A}{\frac{\alpha_T}{\alpha_A} - 2} \quad \text{Equation 5a}$$

Expressed in words, the result of Equation 5a is that for a given $\alpha_T$ and $\alpha_A$ there is an explicit relationship between $T_0$ and $R_A$ which will render the shunt response of the circuit substantially independent of temperature. This result (Equation 5a) of the mathematical operation on Equation 2 involves only the simplifying assumption that S is large relative to R and T, which in practice it always is, S being normally over 100 times $R_A$ and $R_A$ being over 10 times $T_0$. The first condition is thus met.

Now in order to meet the second condition, namely, that the response of the transducer circuit to load shall be substantially independent of temperature, we refer to FIG. 7 and make the simplifying assumption that $R_B$ is a strain gage element having its temperature coefficient of resistance $\alpha_B$ and its temperature coefficient of gage factor $\gamma_B$, both negligibly small. (As stated before, this is not a necessary condition to the application of my principles but in practice gages are available which satisfy this condition closely and therefore simplify the analytical work considerably.) Such gages are commonly made of Constantan alloy. Considering the effect of temperature on the transducer response resulting from the action of elements $R_B$ alone we see that elements $R_B$ tend to offset the drooping characteristic of the load response curve illustrated in FIG. 6 since $R_B$ exhibits the condition $\beta \gg \gamma$ (see FIG. 4) and therefore gives a rising characteristic. Thus, it may be seen that there exists a unique ratio of $R_A$ to $R_B$ such that the load response curve as function of temperature will be a horizontal line; i.e., it will be constant.

The rate of change of the transducer load response with respect to temperature may be calculated by considering separately the temperature-induced effect of $R_A$ and $R_B$ alone, then the effect of T, finally adding the two. For the purposes of the calculation involved here we can ignore the relatively small change in $R_A$ due to its temperature coefficient of resistance $\alpha_A$ since the ratio of $R_A$ to $R_A + R_B$ is very little affected by this small change in $R_A$ and for practical purposes may be considered constant.

Load response, T held constant:

$$\frac{d\frac{E_0}{E_1}}{dt} = \frac{R_B}{R_A + R_B} \cdot \beta + \frac{R_A}{R_A + R_B} \cdot \gamma_A \quad \text{Equation 6}$$

Load response, T alone varies:

$$\frac{d\frac{E_0}{E_1}}{dt} = -\frac{(R_A + R_B)\alpha_T \cdot T_0}{(R_A + R_B + T_0)^2} \quad \text{Equation 7}$$

Superposition of 6 and 7 equated to zero for required condition:

$$\frac{d\frac{E_0}{E_1}}{dt} = \frac{R_B}{R_A + R_B} \cdot \beta + \frac{R_A}{R_A + R_B} \cdot \gamma_A - \frac{(R_A + R_B)\alpha_T \cdot T_0}{(R_A + R_B + T_0)^2} = 0$$

Equation 8

Rearranging Equation 8:

$$\frac{R_B}{R_A + R_B} \cdot \beta + \frac{R_A}{R_A + R_B} \cdot \gamma_A = \frac{(R_A + R_B)\alpha_T \cdot T_0}{(R_A + R_B + T_0)^2}$$

Equation 9

Where:

$$T_0 = \frac{2R_A}{\frac{\alpha_T}{\alpha_A} - 2} \quad \text{Equation 5a}$$

With T held constant it is seen from the Equation 7 above that the rate of change of the load response with respect to temperature is simply the coefficient $\beta$ of the transducer material as contributed by $R_B$ to the arm $R_A + R_B$ plus a proportional part of the gage factor coefficient $\gamma_A$ representing the contribution of $R_A$ to the entire arm $R_A + R_B$. When T alone varies due to temperature it is readily seen from Equation 7 that the rate of change of the load response with respect to temperature will be negative because as T increases the voltage across the bridge input terminals decreases with increasing temperature. The effect expressed by Equation 7 will be simply arrived at by mathematically considering the effect of a change in resistor T equal to $\alpha_T \cdot T_0 \cdot dt$ upon the response to load $E_0/E_1$ of FIG. 7.

Equation 8 combines these two separate effects and equates the total to zero in order to meet the required condition that the response to load must not vary with temperature. The final Equation 9 gives the relationship among $R_A$, $R_B$ and T to satisfy the condition that the response of the transducer circuit to load shall be substantially independent of temperature. The left side of Equation 9 shows the load response as function of the temperature coefficients $\beta$ and $\gamma_A$ of $R_A$ and $R_B$ respectively while the right side illustrated the compensating function of resistor $T_0$, whose value has also to satisfy Equation 5a.

The above mathematical analysis is given merely for purposes of explanation and illustration and by no means limits the scope and usefulness of my present invention. It should be understood that various changes in the circuit details can be made and that these changes may involve different mathematical results and that such changes and modifications may easily be made by one skilled in the art once the basic principles of my invention are understood.

As a practical example based upon actual experience in the use of the principles illustrated in FIG. 7 and the foregoing discussion in solving a problem involving over 50 load transducers which had to meet the above-stated requirements for shunt calibration, I employed as gage element $R_A$ (FIG. 7) a bonded-wire strain gage of commercially available platinum-tungsten alloy. Gages $R_B$ were made of the widely-employed alloy Constantan and were also of the bonded-wire type. Experimental values of certain physical properties of these two strain gage materials, when bonded to steel, are listed below:

Platinum-tungsten alloy wire ($R_A$):

$\alpha_A = 125 \times 10^{-6}$ ohms per ohm per degree F. (See FIG. 3.)

$\gamma_A = -0.35\%$ per 100° F. (See FIG. 5.)

Constantan wire ($R_B$):

$\alpha_B = 0$
$\gamma_B = 0$

These are approximations but close enough for practical purposes of this application.

The value of $\beta$ for the tool steel used in making the load transducers was approximately 2.00% per 100° F.

The nickel wire used in resistor T had a temperature coefficient of resistivity $\alpha_T = 3720 \times 10^{-6}$ ohms per ohm per degree F.

It was required to use bridge arms ($R_A + R_B$) equal to 350 ohms. $R_A$ was made 200 ohms and $R_B$ was made 150 ohms.

As a result of thus applying the principles of my invention I was able to make the response of the transducer circuit to both shunt and load constant within less than approximately 1/20 of 1% for a temperature change of 100° F. In return for this effort, I was able to obtain a 50% increase in the load response of these transducers as compared with the load response that would have been obtained had I employed only strain gages of the conventional Constantan type and a more simple gage circuit arrangement such as that illustrated in FIG. 2.

From these results, it will be seen that by employing a strain sensitive material such as the Tungsten-Platinum alloy referred to above, I can take advantage of its higher gage factor as compared to that of Constantan and thus obtain a significantly greater output from a given transducer design without in any way imparing its safety factor. There are many strain sensitive alloys which have favorable properties for use in an application of my invention. There are, for example, a large number of platinum alloys besides the tungsten family, such as a material known as Elinvar which is useable in my invention, and there are doubtless many other alloys which exhibit gage factors much higher than that of Constantan and which satisfy the other requirements of my application.

*Application of "Split" Temperature Sensing Resistor "T"*

A further object of my invention is to provide means whereby the conditions given in Equations 9 and 5a may be satisfied in case the value of a temperature-sensing resistor $T_0$ as given by Equation 5a will not suffice to meet the condition of Equation 9. This may be the case where the resistance ratio of $R_A$ to $R_B$ is fixed for one or another reason in the design of a transducer. Inspection of Equation 5a will show that as a result of decreasing the resistance $R_A$ in a bridge arm $R_A + R_B$, the required value of temperature resistor $T_0$ will also decrease. Inspecting Equation 9, it will be found that for a smaller resistance portion $R_A$ in a bridge arm $R_A + R_B$, the required value of $T_0$ will increase, since the temperature coefficient of gage factor $\gamma_A$ is negative (see FIG. 5).

I have discovered that for a given ratio $R_A$ to $R_B$, by splitting the resistor $T_0$ in the network between the power terminals and the power input voltage $E_1$, I can find a ratio of temperature sensing resistors $T_1$ to $T_2$, such that the transducer response due to both shunt and load will be substantially independent of temperature variation. FIG. 9 illustrates this preferred arrangement.

Inspection of the bridge network of FIG. 9 will show that by splitting the resistor T of the network shown in FIG. 7 we have not changed its function on the load response with change of temperature. That is, the rate of change of the load response with respect to temperature will be negative and of the same magnitude as if $T_1$ and $T_2$ were lumped into one single resistor $T = T_1 + T_2$.

Consequently, Equation 7 can now be rewritten as follows:

$$\frac{d\frac{E_0}{E_1}}{dt} = -\frac{(R_A + R_B)\alpha_T(T_1 + T_2)}{(R_A + R_B + T_1 + T_2)^2}$$

Equation 10 and accordingly Equation 9 will be rewritten as follows:

$$\frac{R_B}{R_A + R_B} \cdot \beta + \frac{R_A}{R_A + R_B} \cdot \gamma_A = \frac{(R_A + R_B)\alpha_T \cdot (T_1 + T_2)}{(R_A + R_B + T_1 + T_2)^2}$$

Equation 11

Again, the Equation 11 gives the relationship between $R_A$, $R_B$ and $(T_1 + T_2)$ to satisfy the condition that the response of the transducer circuit to load shall be substantially independent of temperature.

Now in order to meet the other condition that the response of the transducer circuit to applied shunt S shall be substantially independent of temperature, for purposes of circuit analysis we refer to the equivalent circuit of FIG. 9 as shown in FIG. 10 in which $$\frac{R_A + R_B}{2} = R$$

Again, the quantity $E_0$ is the open-circuit output voltage resulting from application of shunt S by closing key 11 with a supply voltage $E_1$. An analysis of this simplified equivalent circuit of FIG. 10 for response to shunt S leads to the following result:

$$\frac{E_0}{E_1} = \frac{R(R + T_2)}{3R^2 + 2RS + 2RT_2 + ST_2 + T_1S + 2RT_1 + T_1T_2}$$

Equation 12

In Equation 12, three quantities $R_1$, $T_1$ and $T_2$, all are functions of temperature. In order to make the response $$\frac{E_0}{E_1}$$

due to shunt independent of temperature, it is necessary to satisfy the condition that the derivative of $E_0/E_1$ with respect to temperature shall vanish. That is:

$$\frac{d\frac{E_0}{E_1}}{dt} = \frac{\partial \frac{E_0}{E_1}}{\partial T_1} \cdot \frac{dT_1}{dt} + \frac{\partial \frac{E_0}{E_1}}{\partial T_2} \cdot \frac{dT_2}{dt} + \frac{\partial \frac{E_0}{E_1}}{\partial R} \cdot \frac{dR}{dt} = 0$$

Equation 13

Carrying out the operation and substituting the following:

$$\frac{dT_1}{dt} = \alpha_T \cdot T_1 \qquad \text{Equation 14}$$

$$\frac{dT_2}{dt} = \alpha_T \cdot T_2 \qquad \text{Equation 15}$$

$$\frac{dR}{dt} = \alpha_R \cdot R_0 \qquad \text{Equation 16}$$

we arrive at the following equation:

$$\frac{\alpha_R}{\alpha_T} = \frac{\frac{R}{S}(2T_1 - T_2) + (T_1 - T_2)}{\frac{R}{S}(2T_1 + 4T_2 + 2S) + 2(T_1 + T_2) + \frac{T_1^2 + T_1T_2}{R}}$$

Equation 17

Making the practical simplifying assumption that S is large relative to R and $T_1$ and $T_2$, we can rewrite Equation 17 as follows:

$$\frac{\alpha_R}{\alpha_T} = \frac{T_1 - T_2}{2R + 2(T_1 + T_2) + \frac{T_1^2 + T_1T_2}{R}}$$

Equation 18

For reasons of simplicity one may omit the quantity $$\frac{T_1^2 + T_1 T_2}{R}$$

from Equation 18 since in practice this quantity is over 100 times smaller than $(T_1-T_2)$ and over 1,000 times smaller than $2R$. Then Equation 18 may be expressed as follows:

$$\frac{\alpha_R}{\alpha_T} = \frac{T_1 - T_2}{2R + 2(T_1 + T_2)}$$

or rearranging:

$$2\left(\frac{\alpha_R}{\alpha_T}\right) = \frac{T_1 - T_2}{R + T_1 + T_2} \qquad \text{Equation 19}$$

Referring to Equation 10, it was shown that the load response with temperature of network in FIG. 9 is affected by the sum of resistors $T_1$ and $T_2$ independent of the ratio of $T_1$ to $T_2$. Now, let $T = T_1 + T_2$ be a value determined from Equation 11 for a given resistance ratio $R_A$ to $R_B$ to satisfy the condition that the load response shall be independent of temperature. The Equation 19 can be rewritten as follows:

$$T_1 - T_2 = \frac{2 \cdot \alpha_R}{\alpha_T}(R + T) \qquad \text{Equation 20}$$

Applying the same reasoning as used in arriving at Equation 5a, Equation 20 will be as follows:

$$T_1 - T_2 = 2 \cdot \frac{\alpha_A}{\alpha_T}(R_A + T) \qquad \text{Equation 21}$$

Expressed in words, the result of Equation 21 is that for a given $T(=T_1+T_2)$ and given coefficients $\alpha_A$ and $\alpha_T$, there is an explicit relationship between $T_1-T_2$ and $R_A$ which will render the shunt response of the circuit in FIG. 9 substantially independent of temperature. Consequently, Equations 11 and 21 will determine the total of the temperature-sensing resistance T required as well as the ratio in which this resistance will have to be split in the network for a given resistance ratio $R_A$ to $R_B$ in order that the transducer response due to both shunt and load will be substantially independent of temperature variation.

With further reference to FIG. 9, I have found that I can make final adjustments to the responses of the transducer after it is built and substantially completed by making small variations in the relative values of $T_1$ and $T_2$. In this way I can precisely correct for such small variations in characteristics of the gages and transducer which normally occur in practice. For ordinary accuracy requirements I find such final "trimming" unnecessary, but for cases calling for extreme accuracy over a wide temperature range I employ this technique.

It will, of course, be understood that various changes in details of construction and arrangement of parts may be made by those skilled in the art without departing from the spirit of the invention as set forth in the appended claims.

I claim:

1. A condition responsive transducer in which the response to a condition to be measured is produced by the action of a force, a force actuated elastic transducer element whose elastic modulus decreases with an increase in temperature, a first strain sensitive filament having a positive coefficient of electrical resistance and a negative coefficient of gage factor, a second strain sensitive filament electrically connected to said first filament so as to form a single two-terminal strain gage, a bridge network including a Wheatstone bridge circuit and having two power input terminals and two output terminals, a source of power connected across said two power input terminals, means responsive to the output of said network connected across said output terminals, said two-terminal gage comprising one arm of said Wheatstone bridge circuit, the electrical resistances of said first and second filaments varying in accordance with strain applied thereto and being so proportioned to each other that said two-terminal strain gage has predetermined positive temperature coefficient of resistance and a predetermined negative temperature coefficient of gage factor, said first and second filaments being connected to said elastic transducer element so as to be responsive to strains thereof resulting from said condition to be measured and both being subject to strain of the same algebraic sign and to substantially the same temperature as said elastic transducer element, an electrical shunt resistance which is larger than the resistance of said two-terminal strain gage and which is connectible across one output terminal and one input terminal so as to shunt across the lowest resistance path through said two-terminal gage to produce a network output signal corresponding to a given condition, temperature responsive means included within said network and connected in series with and external of said Wheatstone bridge circuit and said power input terminals and being so located as to be subject to substantially the same temperature as said elastic transducer element, said predetermined temperature coefficients and the magnitude of resistance of said temperature responsive means being so related that acting together the response of said bridge to the output of said network in response to a given condition is substantially independent of temperature and so that the output of said network due to connecting said shunt resistance is substantially independent of temperature.

2. The combination set forth in claim 1 further characterized in that the temperature responsive means comprises a temperature sensitive resistance element connected to the input terminal remote from said two-terminal gage and said shunt resistor is connectible directly across the terminals of said two-terminal gage.

3. The combination set forth in claim 1 further characterized in that said temperature responsive means comprises a first and a second temperature sensitive resistance element, said first element being connected to the input terminal remote from said two-terminal gage and the second element being connected to the remaining input terminal, and said shunt resistance is connectible in parallel with said second temperature responsive element and said two-terminal gage taken in series.

References Cited in the file of this patent

UNITED STATES PATENTS

| | | |
|---|---|---|
| 2,350,972 | Ruge | June 6, 1944 |
| 2,920,298 | Hines | Jan. 5, 1960 |

OTHER REFERENCES

Pamphlet entitled: "A Report On Wire Strain Transducer System Calibration," published by Allegany Instrument Co., Inc., received by U.S. Patent Office May 10, 1956, pages 14 and 15 pertinent, Classified 73-1 (Copy in Div. 36).